United States Patent [19]

Matheny

[11] 3,916,117

[45] Oct. 28, 1975

[54] KEY TELEPHONE INTERRUPTER

[75] Inventor: Coy Edwin Matheny, Corinth, Miss.

[73] Assignee: International Telephone and Telegraph Corporation, New York, N.Y. ;

[22] Filed: May 15, 1974

[21] Appl. No.: 469,952

[52] U.S. Cl. .............. 179/99; 179/84 A; 179/18 AD

[51] Int. Cl.² ........................................... H04Q 1/30

[58] Field of Search ........ 179/99, 81 R, 81 C, 84 R, 179/84 A, 84 L, 18 AD

[56] References Cited

UNITED STATES PATENTS

| | | | |
|---|---|---|---|
| 3,341,665 | 9/1967 | Merrel et al | 179/84 L |
| 3,395,256 | 7/1969 | Limiero et al. | 179/99 |
| 3,471,651 | 10/1969 | Saia et al. | 179/84 A |
| 3,818,146 | 6/1974 | Takubo et al. | 179/99 |

*Primary Examiner*—Kathleen H. Claffy
*Assistant Examiner*—Gerald L. Brigance
*Attorney, Agent, or Firm*—James B. Raden; Marvin M. Chaban

[57] ABSTRACT

An electronic interrupter for enabling a plurality of alternating currents at various amplitudes and switching rates suitable for key telephone signaling is provided. The present interrupter may directly replace an electro-mechanical interrupter by merely substituting its leads for those of the EM interrupter. The interrupter provides two basic lamp interruption rates in addition to a buzzer amplitude at one rate and a ringing voltage at another rate. These rates are the usual rates applied in key telephone systems for winking and for flashing the indicator lamps and audible signaling at stations of a line, the rate being used to indicate the condition of the line at the stations. Three basic interruption rates provide time-controlled gating at these interrupted current rates for a switch operating at high frequency. The electronic switch operated by the gated high frequency enables a path from the source of current to the load (visual or audible signal) during the time controlled period.

10 Claims, 3 Drawing Figures

KEY TELEPHONE INTERRUPTER

BACKGROUND OF THE INVENTION

In key telephone systems, interrupted lamp currents have generally been provided by mechanical timing interrupters such as plural timing relays or motor-driven cams. The latter is shown by U.S. Pat. No. 2,812,386 issued November 5, 1957. Such circuits are still in general use to provide the desired different types of interrupted or pulsed AC. Where electronic circuits have been used, these have generally performed a switching operation between one or another interrupted current sources and the line circuit for transmission to the lamps on the line.

SUMMARY OF THE INVENTION

An electronic interrupter circuit is provided which produces at a first output terminal an AC signal interrupted at what is known in key telephone terminology as a flashing rate and at a second output terminal, an AC signal interrupted at what is known as the winking rate. At other output terminals, interrupted ringing current at an elevated voltage level is available and at a fourth terminal, buzzer current at a fourth interruption rate is provided. Each of these outputs is produced in an accurate manner by a circuit which can carry loads equal to those of an electromechanical interrupter or greater. The electronic circuit uses only solid state devices in addition to resistors and capacitors so that its life expectancy is considerably greater than that of any electromechanical relay or motor.

It is standard key telephone system practice to use the following AC signal voltages to produce audible and/or visual indication of the state of a line circuit which is connected to a Central Office or Private Branch Exchange line. The line circuit only directs these signals. The signals originate in the well-known key telephone interrupter. The electronic interrupter will switch 10 VAC at two different rates; one being approximately 0.45 seconds on and 0.05 seconds off; the second being approximately 0.5 seconds on and 0.5 seconds off. These 10 VAC signals (the first being called lamp wink and the second, lamp flash) are routed by the line circuits to their respective lamps in a key telephone set. there is also a provision for switching a signal of either 10, 18 or 105 VAC at a rate of approximately 1 second on and 3 seconds off. This signal is used for audible signaling devices such as buzzers and ringers. An optional circuit may be provided to provide a timing sequence of approximately 0.5 seconds on and 0.5 seconds off.

Each of the outputs is produced in essentially the same manner so that explanation of any one will suffice. A free running multivibrator produces its output at a rate identical with the rate of the output visual or audible signal to be produced. The multivibrator output completes or gates a path from a common high frequency multivibrator to operate an electronic switch. The switch is in the path from an AC signalling source to a signal load (lamp or audible device) and on operation produces a signal on the line circuit input lead for the signalling member. The line circuit controls the selective transmission of the signal from its input lead to the signal load, in a known manner. Thus, the interrupter produces the interrupted signal at the proper rate on the suitable line circuit input lead continuously for switching as necessary to produce the output signal.

The ringing multivibrator is not operated continuously but responds to the input on its start lead to produce its gated, interrupted 105 volt output to the line circuit.

It is therefore an object of the invention to provide an electronic interrupter circuit which provides at separate terminals, the lamp and ringing signals for controlling the visual and audible signals of a key telephone system.

It is a further object of the invention to provide a plurality of different pulse outputs suitable for use in controlling key telephone system signalling.

It is a still further object of the invention to provide an output signal at a predetermined recurring rate, the signal occurring only during the coincidence of an input signal recurring at a rate like that of the output and a high frequency signal.

Other objects, features and advantages of the invention will become apparent from the following description viewed in conjunction with the drawings described in brief next.

DETAILED DESCRIPTION OF THE DRAWINGS

Figures 1, 3:
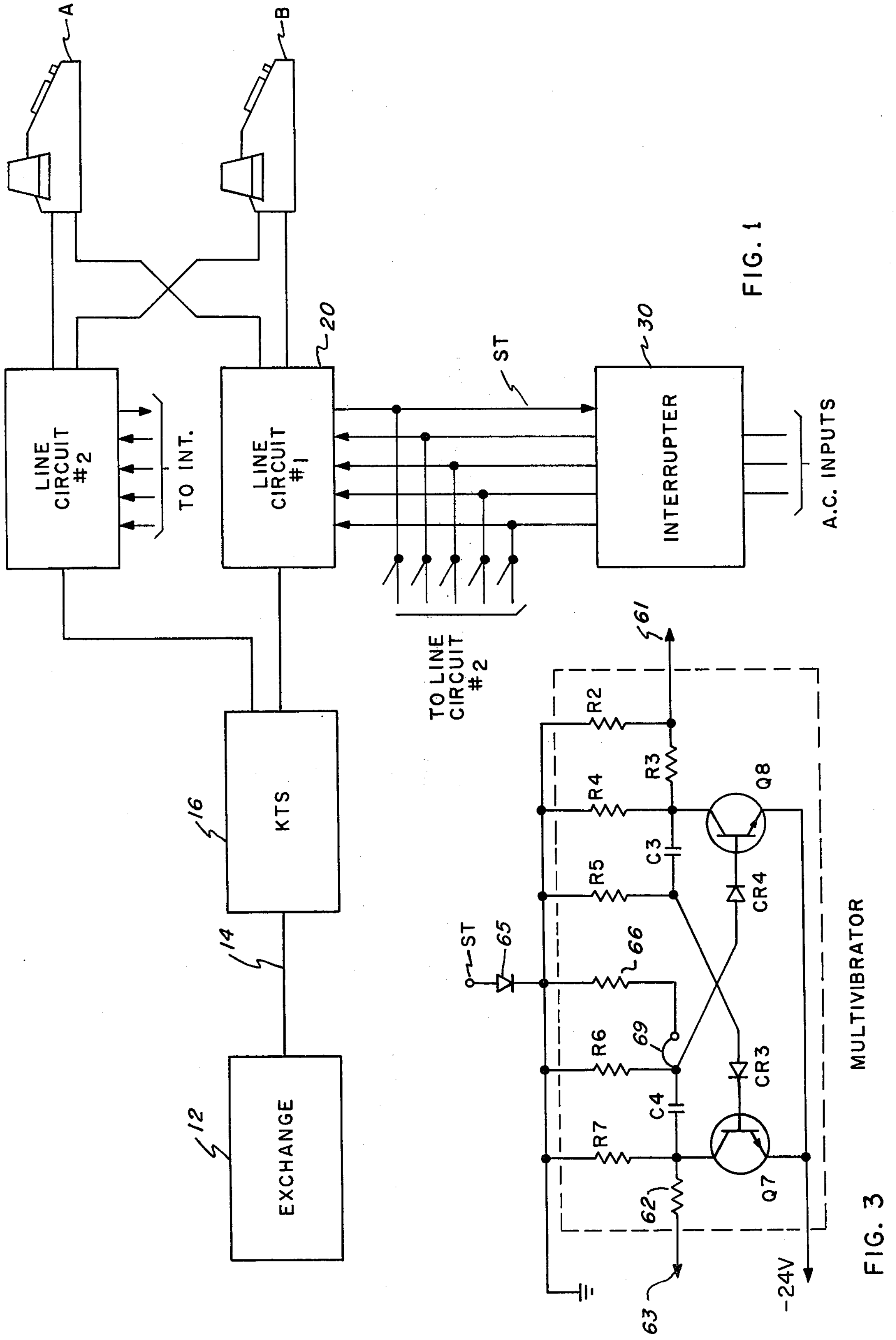
FIG. 1 is a block diagram of the circuits of a key telephone system.
FIG. 3 is a schematic circuit diagram of a representative one of the multivibrators used herein.

In FIG. 1, I show a telephone exchange 12 with a cable 14 leading to a key telephone unit 16 at a remote location such as a small office. The key telephone unit has a plurality of lines, two of which are shown as line circuits No. 1 and No. 2. These line circuits may be of any type known in the art, such as the one shown by U.S. Pat. No. 3,436,488 to Barbato issued Apr. 1, 1969. Each of the line circuits has an appearance at both station instruments shown, instrument A and instrument B. These instruments are conventional key telephone with lamp-equipped pushbutton per line, ringer or buzzer and hold button, all of which are conventionally known in the art.

At the key telephone unit location, there is also a multiple output signalling interrupter 30 or source of the different currents necessary to provide signalling at the stations of the system. In most systems, as indicated, the interrupter is electromechanical, the selection and duration of outputs being controlled within the line circuit requiring an output from the interrupter.

The interrupter is powered from three AC inputs, these being 10 volts, 18 volts and 105 volts. DC bias of —24 volts and ground, both generally available in telephone systems are also employed. The interrupter outputs are provided on leads designated LF, LW, B2 and R to the line circuit. In any known fashion within the line circuit, the path from these leads are completed selectively to produce the audible or visual signalling well-known in the art.

Figure 2:
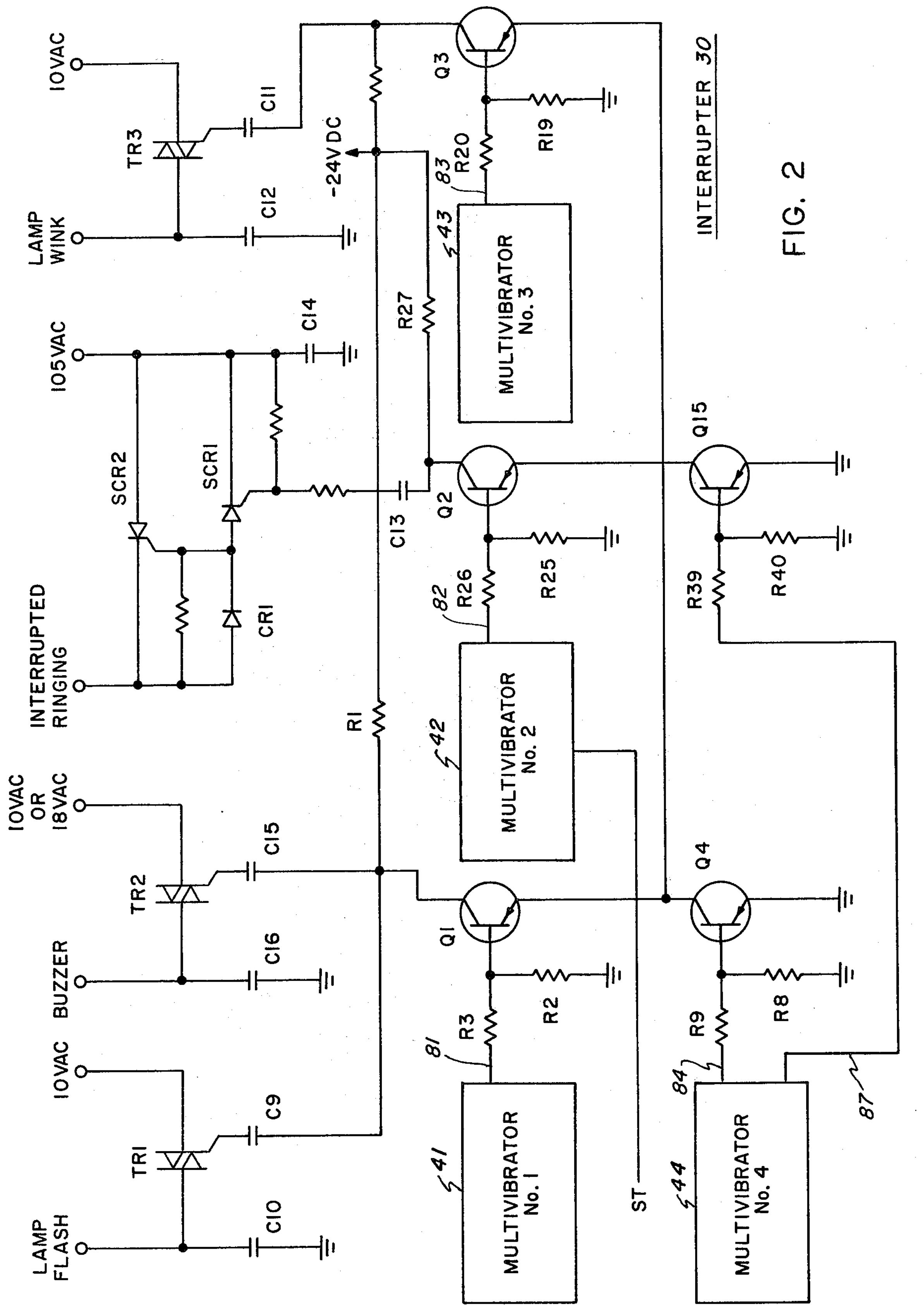
FIG. 2 is a schematic circuit diagram partially in block form of the interrupter circuit of the present invention.

With reference to FIG. 2, the electronic interrupter of my invention includes four free-running multivibrators designated 41–44, five gated transistors designated Q-Q4 and Q15, three triacs TR1-TR3 and two silicon controlled rectifiers SCR1 and SCR2.

The four multivibrators 41–44 include three low frequency outputs at multivibrators 41–43 and one high frequency multivibrator 44. The output of multivibrator 41 is used to provide lamp flash and buzzing signals at its output of 0.5 seconds on and 0.5 seconds off. The output of multivibrator 42 provides the interrupted ringing control for a rate of 1 second on and 3 seconds off. Multivibrator 43 provides the control for the lamp wink output of 0.45 seconds on and 0.05 seconds off for lamp wink current. The fourth multivibrator provides a high frequency output at a rate which may be set in the range of 1 to 8 KHZ to enable the switching output to the triacs.

Timing signals from multivibrators 41–44 are applied to the respective bases of transistors Q-Q4 on leads 81–84. A signal from multivibrator 44 is also fed to the base of transistor Q15 on lead 87 through resistor R39. These signals cause the transistors to saturate and cut off. The emitters of transistors Q1 and Q3 are joined at a common point and connected to the collector of transistor Q4. The emitter of Q2 is connected to the collector of Q15. Transistors Q4 and Q15 are turned on and off at approximately a 1 KHZ rate. The simultaneous saturation of transistors Q1 and Q4 produces a gated output at the collector of Q1 of 1 KHZ square waves. This signal is coupled through capacitor C9 to the gate of triac TR1. Triac TR1 is gated on and off at a rate of 0.5 seconds on and 0.5 seconds off, switching a 10 VAC signal. Because of the amplitude and frequency of the triggering pulses, triac TR1 is kept in the conducting state for 360° of the input current of the 10 VAC supply. Triacs TR2 and 3 are operated in the same manner but from the outputs of Q2 and Q3 respectively.

Silicon controlled rectifiers SCR1 and SCR2 are operated as follows: The gate current to turn on SCR1 flows through capacitor C13 into the gate of SCR1 and through C14 to ground. The reactances of capacitors C13 and C14 are low enough to allow a triggering current in excess of the minimum required to turn on SCR1. SCR2 is turned on by the reverse current flowing from the anode of SCR1 into the gate of SCR2 on the positive going transition of the high frequency triggering signal. The circuit of SCR1 and SCR2 will latch on a current from anode to cathode and vice versa of from 1 milliampere to 1 ampere. The triggering signal for SCR1 and SCR2 is the gated (1 second on, 3 seconds off) high frequency output of Q2 and Q15.

The ring current multivibrator 42 that generates the 1 second on, 3 seconds off timing is started by a ground on the ST lead to the start (ST) circuit, a well-known expedient in key systems. If desired, the circuit may be allowed to run free without the need of a start lead since no electromechanical parts are necessary.

The triacs and SCR's are interposed between load and source in what is considered to be a novel manner. Triggering these devices under similar condition has in the past posed problems. The use of a square wave triggering voltage with a repetition rate 25 or more times the frequency of the switched voltage allows for simplification of design, by connecting a high frequency bypass in parallel with the load. The triggering voltage, because of the sharp rise and fall times, sees a low impedance path for current flow while the switched voltage sees a high impedance path in parallel with the load. At 20 Hz, 30 Hz, and 60 Hz, the capacitors C9-12, C15 and C16 placed in parallel with the loads represent approximately an 80,000 ohms, 53,000 ohms, and 26,500 ohms impedance respectively but to a rise and fall time of 10 microseconds represents less than 100 ohms impedance. Therefore, the low frequency gating of a high frequency component represents a most convenient method of controlling the solid state switches.

The present solid state interrupter is designed to work from a supply voltage of −12 VDC to −30 VDC. Shown is a 24-volt DC which can be supplied by a key system power supply. The interrupter unit is versatile in that the timing functions can be varied by changing the values of the components in the timing multivibrators. The output current capabilities of the lamp circuit switches can be increased from 6 to 16 amperes by changing the triacs, the triggering circuit being capable of delivering the necessary gate current.

In FIG. 3, I show a representative one of the multivibrators, the other three being identical in circuit configuration with different value components. The multivibrator of FIG. 3 is considered to be a known two-transistor arrangement with its transistors Q7 and Q8 in symmetrical bistable configuration with its normal output on lead 61 this lead feeding the respective leads 81–84 feeding the base of the respective switching transistor Q1-Q4. No further explanation is deemed necessary for such a circuit, it being known that by providing various values for the resistors R2-R7 and capacitors C3 and C4, the characteristics of the circuit may be varied.

In the case of multivibrator 44, two outputs are provided — one on lead 61 and the other on lead 63, lead 63 being connected to the emitter of transistor Q7 and lead 61 to the emitter of transistor Q8. Thus, transistor Q1 is gated during one-half cycle of multivibrator 44, and transistor Q2 during the other half-cycle.

Within multivibrator 42, the start lead ST from the line circuit is connected through diode 65 and resistor 66 and strap 69 to the anode of diode CR4. In this case, resistor R6 may be omitted. As is known, the start lead is closed during ringing by operation of a ring relay in the line circuit to provide a ring start.

In this manner there is provided a signal recurring at a proper rate to control a gating path for a high frequency signal. The high frequency signal, in turn, controls a switching device interposed directly between an AC source and a load to switch the AC only during the recurring signal intervals.

I claim:

1. A circuit for coupling an AC source to a load during recurring periods of predetermined duration and at a predetermined rate, comprising: one oscillator productive of an output signal at said rate and duration, electronic gate means controlled by said output signal to pass a high frequency signal, switching means between said source and said load and responsive to the receipt of high frequency signal for completing said source to load path only during periods when said gate means passes said high frequency.

2. A circuit as claimed in claim 1, in which said oscillator comprises a multivibrator, and in which there is a source of high frequency signals for producing said high frequency signal, and in which said high frequency signal comprises a signal above 1 KHZ in frequency.

3. A circuit as claimed in claim 1 in which there is a source of said high frequency signal comprising multivibrator productive of signal in the 1 to 10 KHZ range.

4. A circuit as claimed in claim 1 wherein there are a plurality of independent oscillators generally similar to said one oscillator, each productive of signals at a different predetermined rate and duration, gate means controlled by each respective oscillator for completing respective output paths through the respective gate means, and a source of said frequency signal common to all said gate means, and output switching means in each path switched on by high frequency signal to produce an output condition in said output path during pendency of signals from the respective oscillators.

5. A circuit for providing interrupted AC signalling current for use in key telephone systems, said circuit including a first multivibrator productive of recurring signals at a predetermined rate and duration, a second multivibrator productive of output frequency in excess of 1 KHZ, first means gated by said recurring signals for passing said output frequency only during periods of said recurring signals, second means gated by said passed output frequency for closing a path between a source of AC and a signalling load circuit.

6. A circuit as claimed in claim 5, wherein said second means comprises a three element semiconductive device with load terminals interposed between said AC source and said load circuit.

7. A circuit as claimed in claim 6, wherein said second gating means comprises a gate terminal receptive of said passed output frequency for switching through the path between said AC source and said load, said load being signal indicating means for a line of said key telephone systems.

8. A circuit for providing a plurality of interrupted AC currents for use in both audible and visual signalling of line conditions in key telephone systems, said circuit including a plurality multivibrator each productive of recurring signals at a different predetermined rate and duration suitable for key telephone signalling, another multivibrator productive of output frequency in excess of 1 KHZ, individual first means each connected to an output of a respective multivibrator of said plurality, said first means each comprising a gate by recurring signals from its multivibrator for passing output frequency from said other multivibrator only during periods of recurring signals from the respective multivibrator, second means coupled individually to each of said first means and gated independently by said passed output frequency for closing a path between a source of AC and a signalling load circuit.

9. A circuit as claimed in claim 8, wherein each said second means comprises a triac, a gate terminal of each such triac coupled to an output of a respective first means.

10. A circuit as claimed in claim 9, wherein each said individual first means comprises a transistor with its base terminal coupled to the output of its respective multivibrator and said other multivibrator connected in multiple to another terminal of each transistor.

* * * * *